May 28, 1968  A. J. WILSON ETAL  3,385,167
FLUID PRESSURE OPERATED BOOSTERS
Filed Nov. 21, 1963  3 Sheets-Sheet 1
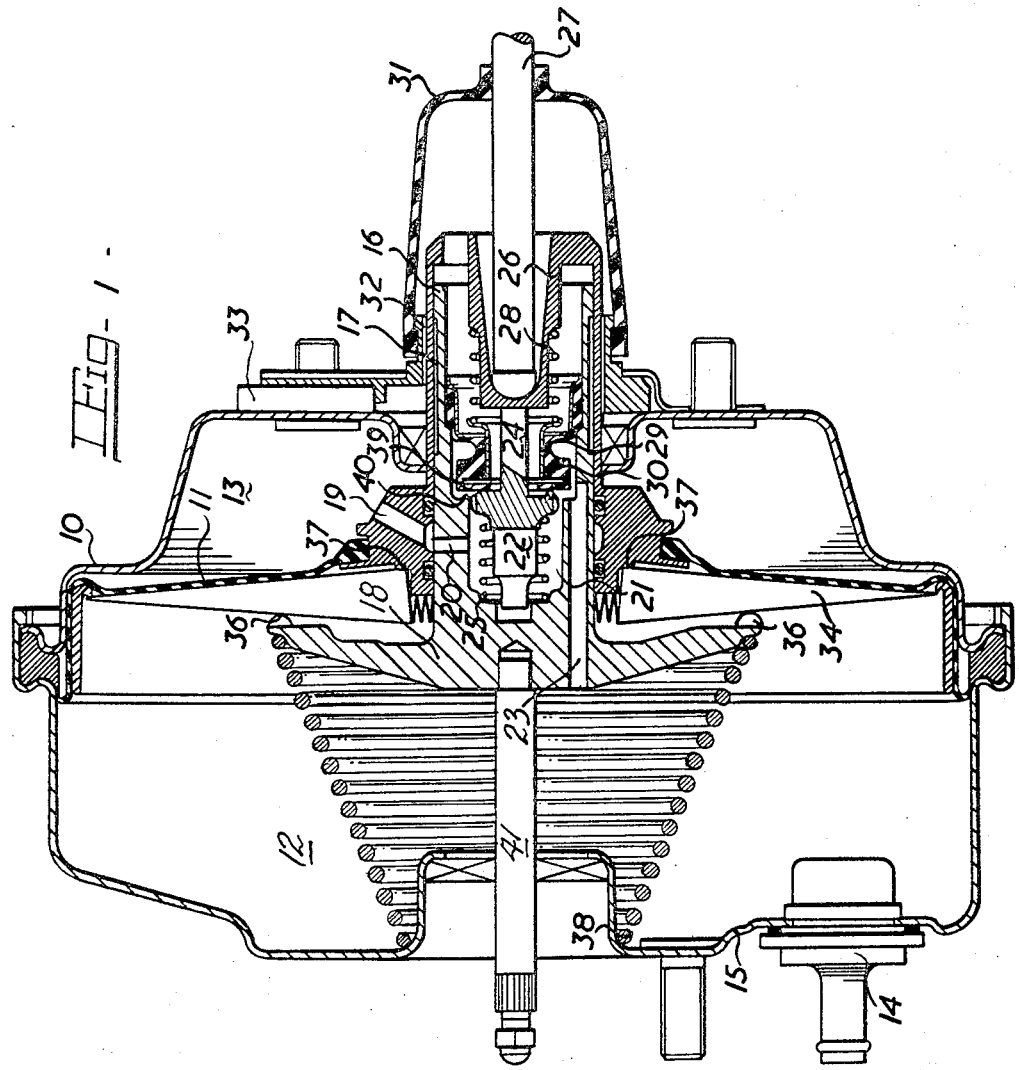
FIG-1-
INVENTOR
Alexander John Wilson + Harold Fineman
BY
Scrivener Parker Scrivener + Clarke
ATTORNEY

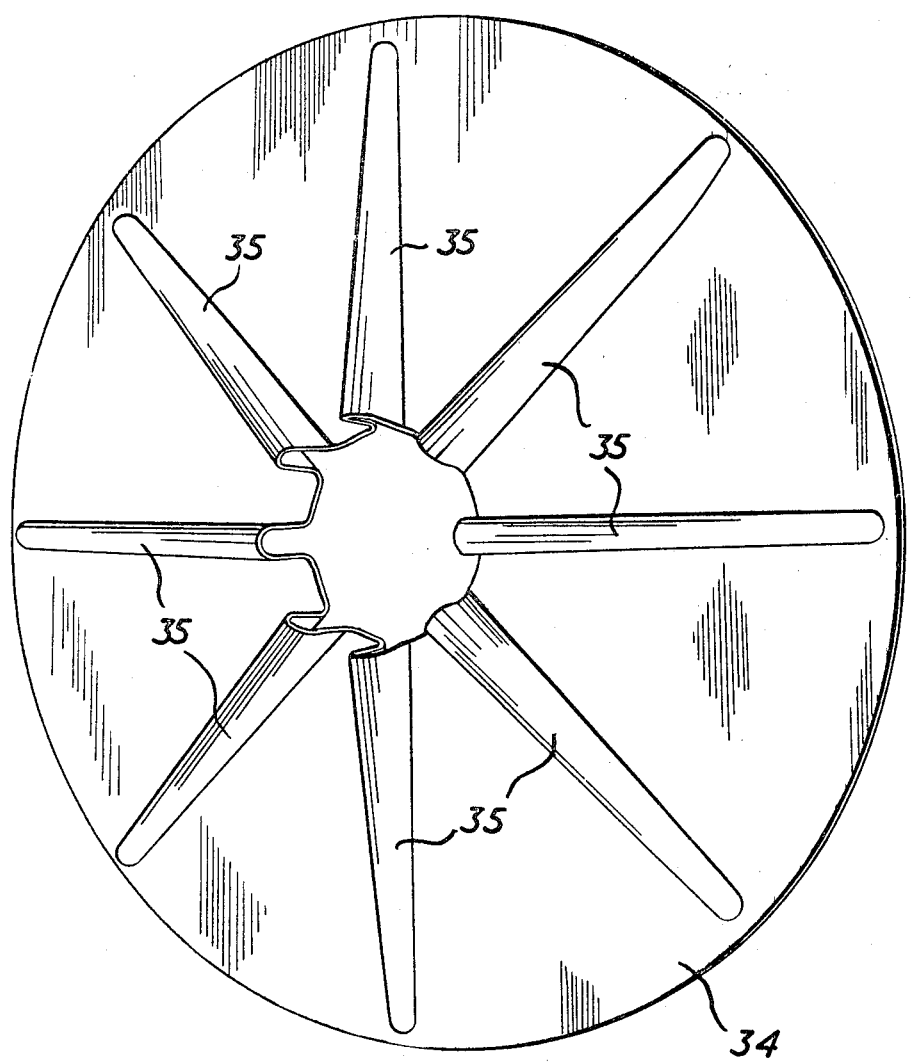

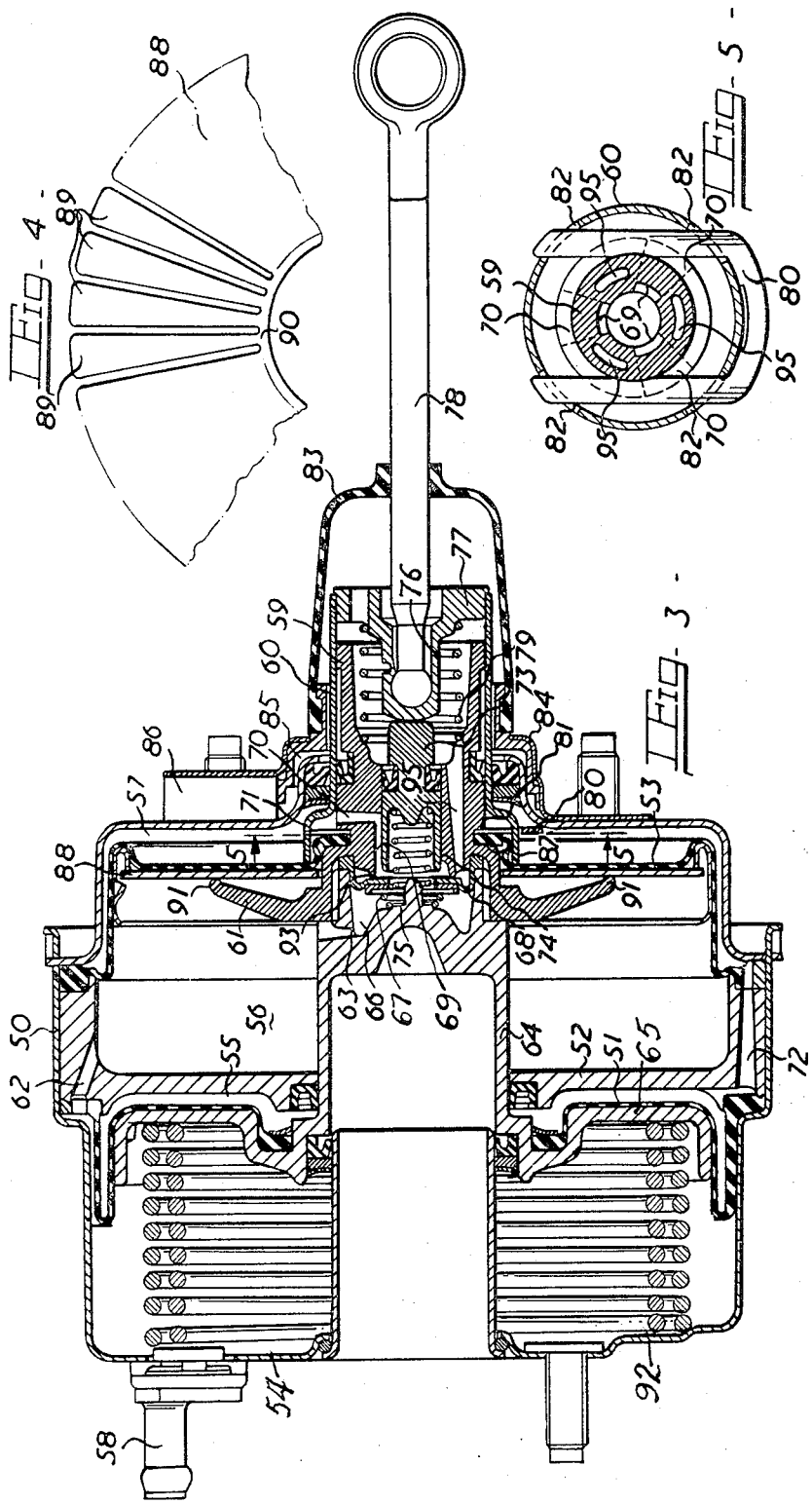

United States Patent Office 3,385,167
Patented May 28, 1968

3,385,167
FLUID PRESSURE OPERATED BOOSTERS
Alexander John Wilson, Warwickshire, and Harold Fineman, Birmingham, England, assignors to Girling Limited, Birmingham, England, a British company
Filed Nov. 21, 1963, Ser. No. 325,227
Claims priority, application Great Britain, Nov. 21, 1962, 43,985/62
10 Claims. (Cl. 91—369)

This invention relates to improvements in fluid-pressure operated boosters of the kind in which power is generated by the application of differential fluid pressures to opposite sides of a movable wall under the control of a mechanically operated valve.

In systems employing boosters of this kind, and particularly in braking systems for vehicles where the valve is manually controlled, it is desirable that there should be a reaction on the valve operating rod or the like proportional to or dependent upon the differential pressures on opposite sides of the wall so that the operator is given the "feel" of the brakes and can more readily regulate their application.

According to one feature of our invention, in a fluid-pressure operated booster incorporating a control valve mechanism and a movable wall, the movable wall dishes or is deformed conically by differential pressure when the booster is energized, and the dishing or deformation provides a reaction on booster operating means dependent upon the differential pressure.

According to a further feature of our invention, in a fluid pressure operated booster incorporating a control valve mechanism and a movable wall, the control valve mechanism is received within the hollow stem of a generally mushroom shaped transmission member passing through the wall and the forward face of the wall abuts against one end of the transmission member to move it forward when the booster is energized, and the rear face of the wall abuts at a position radially inwards of the abutment with the transmission member against a reaction component slidable upon the stem, the wall dishing or deforming conically by differential pressure and the dishing or deformation provides a reaction on the control valve mechanism which is dependent upon the differential pressure.

The wall is provided with a central opening and the outer sleeve is in engagement with the inner edge of the wall adjacent the opening.

The wall is conveniently provided by a flexible piston, or alternatively a diaphragm, which preferably is stiffened by a flexible ring secured thereto, and which may have a series of radially directed flutes on its forward face adapted to abut against an annular abutment ring on the head, the rear face of the wall providing the abutment with the reaction component.

Alternatively the head may have adjacent its periphery a series of circumferentially spaced abutments against which the portions of the disc between the flutes are adapted to bear.

Alternatively the wall may have a series of separate fingers extending from its periphery to its central opening and joined together by a narrow annular connecting portion which may be arranged to lie at any radial distance from the central opening.

Two practical forms of fluid-pressure operated boosters embodying our invention are illustrated in the accompanying drawings in which:

FIGURE 1 is a longitudinal section through a booster;
FIGURE 2 is an isometric view of a deformable wall incorporated in the booster shown in FIGURE 1;
FIGURE 3 is a longitudinal section through a tandem fluid-pressure operated booster;
FIGURE 4 is an end elevation of part of a deformable wall incorporated in the booster shown in FIGURE 3; and
FIGURE 5 is a scrap section on the line 5—5 of FIGURE 3;

In the booster illustrated in FIGURE 1, 10 is a housing or cylinder of the booster which is divided by a diaphragm 11 into front and rear chambers 12 and 13 respectively. The forward chamber 12 is connected to the inlet manifold or other source of vacuum by a connection 14 housing a non-return valve and mounted on the front wall 15 of the cylinder and the rear chambers is also connected to vacuum through valve means controlling passages in a valve mechanism for the booster.

The valve mechanism comprises a pair of concentric sleeves 16 and 17 of which the inner sleeve 16 is slidably mounted in the outer sleeve 17 and is generally of mushroom shape having on its forward end a head 18 of substantial diameter. The rear chamber 13 is normally in communication with vacuum through a port 19 in the wall of outer sleeve co-operating with a radial port 20 in the wall of the inner sleeve which leads into a blind bore 21 in which works an axially movable valve spool 22, the blind bore 21 communicating with the forward chamber 12 through a longitudinal bore 23 in the inner sleeve.

Stem 24 of the valve spool 22 is urged by a compression spring 25 into engagement at its rearward end with a forwardly extending axial portion 26 of the outer sleeve which is recessed to receive an actuating rod 27. The outer sleeve 17 is resiliently biased in a rearward direction by a compression spring 28 engaging at one end with the axial portion 26 of the outer sleeve and at the other end with a cylindrical abutment member 29 attached to a flexible rubber cylindrical boot like insert 30 connected to the inner sleeve. The rear ends of the sleeves are enclosed by a boot 31 through which the actuating rod extends and which is in communication with atmosphere through a passage 32 and an air filter 33.

The diaphragm 11 is clamped at its outer edge to the periphery of the housing or cylinder 10 and is secured at its inner edge to the outer sleeve 17. In front of the diaphragm there is a centrally apertured resilient or flexible sheet metal or other disc 34 (FIGURE 2) which is formed with a series of angularly spaced flutes 35 of which the axial depth tapers from a maximum at the centre to a minimum or zero at the periphery of the disc, the flutes being directed forwardly. The rear face of the disc is engaged by the diaphragm 11 over the outer part of its area, the flutes 35 bear at intermediate points in their lengths on a rearwardly facing annular abutment 36 on the head 18 of the inner sleeve 16, and the inner edge of the disc engages a forwardly facing annular shoulder 37 on the outer sleeve.

Normally both chambers 12 and 13 are in communication with a source of vacuum as described above, the diaphragm being balanced and held in position by a return spring 38. The spool valve 19 is resiliently urged into engagement with the forward face 39 of the rubber insert 30 to prevent atmospheric air from entering the rear chamber 13.

When the actuating rod is operated it moves the outer sleeve 17 forwardly to apply a forwardly directed force to the inner edge of the fluted disc 34 and at the same time it advances the valve spool 22 until the front face 39 of the rubber insert 30 engages an annular seating 40 in the inner sleeve 16 adjacent the bore 21 in which the valve spool works and which isolates the rear chamber of the booster by cutting off the vacuum supply through passage 23 in the inner sleeve 16.

Further movement of the actuating rod moves the valve spool away from engagement with the forward face 39 of the rubber insert to allow air to pass through the inner sleeve past the valve spool and through passages 20 and 29 in the sleeves and enter the rear chamber 13 to act on the diaphragm. As the diaphragm moves forwardly it takes with it the outer sleeve 17 which actuates the piston of the master cylinder through a rod 41 and the head 18 of the inner sleeve and at the same time it tilts the outer portion of the disc relative to the head and levers formed by the flutes 35 are tilted about their abutments 36 on the head and apply a rearwardly directed force to the outer sleeve by the engagement of the inner edge of the disc with the annular shoulder 37, this force being transmitted to the actuating rod 27 and hence to the operator's foot.

In another arrangement the annular abutment is replaced by separate circumferentially spaced abutments against which the portions of the disc between the flutes are adapted to bear.

In the event of failure of the booster the valve spool 22 is arranged to engage the inner sleeve at the forward end of the blind bore 21 so that the effort applied to the actuating rod can be transmitted mechanically through the two sleeves and the valve spool to the piston of the master cylinder to apply the brakes.

In the tandem booster illustrated in FIGURES 3, 4 and 5, 50 is a housing or cylinder of the booster which is divided by diaphragm 51, partition 52 and diaphragm 53 into four chambers 54, 55, 56 and 57. The forward chamber 54 is connected to the inlet manifold or other source of vacuum by a connection 58 housing a non-return valve and mounted on the front wall of the cylinder. Normally the remaining chambers are also connected to vacuum from chamber 54 through valve means controlling communicating passages in the booster and in the valve mechanism for the booster.

The valve mechanism comprises a pair of concentric sleeves 59 and 60 of which the inner sleeve 59 is slidably mounted in the outer sleeve 60 and is generally of mushroom shape having on its forward end a head 61 of substantial diameter. A locking plate 80 of generally U shape engages with an annular shoulder 81 on the inner sleeve and with four radial slots 82 in the outer sleeve which extend longitudinally to permit relative axial movement between the sleeves to take place.

In the inoperative position shown in FIGURE 3 all the chambers of the booster are in communication with the source of vacuum, chamber 56 communicating with chamber 54 through a passage 62 in the partition 52; chamber 57 communicating with chamber 56 through a passage 63 in the piston rod 64 integral with a piston 65 in front of the diaphragm 51 and leading into a rearwardly facing recess 66 at the rear end of the piston rod 64 and which communicates with chamber 57 through a valve member 67 mounted on a diaphragm 68 and longitudinal passages 69 in the inner sleeve 59 which communicate with radial ports 70 in the inner sleeve and a port 71 in the outer sleeve; and chamber 57 communicating with chamber 55 through a passage 72 in the partition 52.

The diaphragm 51 is clamped at its outer edge to the periphery of the housing or cylinder 50 and secured at its inner edge to the piston 65 and the diaphragm 68 on which the valve member 67 is mounted is clamped at its outer edge between the rear end of the piston rod 64 and the forward end of the inner sleeve 59 which are in screw-threaded engagement.

A valve spool 73 working in an axial bore 74 in the inner sleeve 59 is resiliently biassed by spring 75 into engagement at its rear end with the forwardly extending axial portion 76 of a closure 77 for the rear end of the outer sleeve 60 and which is recessed to receive one end of an actuating rod 78. The outer sleeve 60 is resiliently biassed in a rearward direction by a compression spring 79 engaging at one end with the end closure 77 and at the other end with an abutment formed in the inner sleeve 59.

The rear ends of the sleeves are enclosed by a boot 83 through which the actuating rod 78 extends and which is attached to a cylindrical member 84 secured to the outer sleeve 60. The interior of the boot is in communication with atmosphere through a passage 85, between the member and the outer sleeve and the housing or cylinder of the booster, and an air filter 86.

The diaphragm 53 is clamped at its outer peripheral edge between the partition 52 and the housing or cylinder 50 and secured at its inner edge between the annular shoulder 87 and an annular shoulder 81 on the inner sleeve 59.

In front of the diaphragm there is a centrally apertured resilient or flexible sheet metal or other disc 88 of which a portion is illustrated in FIGURE 4 and which is slit radially to form a series of separate fingers 89 extending from the periphery of the disc to its central opening and joined together by a narrow annular connecting portion 90 which may be arranged to lie at any radial distance from the central opening. The inner edge of the disc around the central opening is engaged by the forward end of the outer sleeve 60 and at an intermediate position in its radial width the disc bears on a stationary annular abutment 91 on the head 61 of the inner sleeve 59. The disc 88 and the diaphragm 53 conveniently form a movable wall.

Normally the chambers 54, 55, 56 and 57 are in communication with a source of vacuum as described above, the diaphragms 51 and 53 being balanced and held in position by a return spring 92 and atmospheric air is prevented from entering chambers 55 and 57 by the valve member 67 engaging an annular seating 93 on the forward end of the inner sleeve 59.

When the actuating rod is operated it moves the outer sleeve 60 forwardly to apply a forwardly directed force to the inner edge of the movable wall formed by the disc 88 and the diaphragm 53 and at the same time it advances the valve spool 73 until its forward face engages with the valve member 67 which isolates chambers 55 and 57 of the booster by cutting off the vacuum supply from chamber 56, through the passages 69 and radial parts 70 in the inner sleeve and port 71 in the outer sleeve. Further movement of the actuating rod moves the valve member away from its seating 93 to allow atmospheric air to pass from inside the boot 83 through passage 94 in the end closure 77 of the outer sleeve 60, longitudinal passages 95 in the inner sleeve 59 and into the chamber 57 through port 71. From chamber 57 air passes into chamber 55 by way of passage 72 in the partition 52.

The atmospheric air acts on the diaphragms 51 and 53 which move forwardly taking with them the inner sleeve 59 and the piston 65 which actuates the piston of the master cylinder through a rod (not shown). As there is a higher pressure exerted against the side of the movable wall formed by the disc 88 and the diaphragm 53 opposite the annular abutment 91 on the head 61, the effective annular centre of pressure lies radially outwards from the annular abutment so that the outer part of the disc 88 is tilted relative to the head 61 of the inner sleeve and levers formed by the fingers 89 are tilted about their abutments 91 and apply a rearwardly directed force to the outer sleeve 60 by the engagement of the inner edge of the disc with the forward end of the outer sleeve, this force being transmitted to the actuating rod 78 and hence to the operator's foot.

Preferably the arrangement is such that the actuating rod 78 and outer sleeve 60 move through a sufficient distance to cause the movable wall to assume a conical formation before the valve spool engages with the valve member 67, to isolate other chambers 55 and 57 and before air is admitted to these chambers. The movable wall is then returned to a substantially flat condition by the differential pressures acting on its opposite sides so that the wall performs its controlling function while it is substantially flat and it then has greater sensitivity and provides more accurate control.

In the event of failure of the booster the end closure 77 of the outer sleeve is arranged to engage the rear end of the inner sleeve so that the effort applied to the actuating rod 78 can be transmitted mechanically through the two sleeves to the piston of the master cylinder to apply the brakes.

We claim:

1. A fluid-pressure operated booster comprising a housing, a diaphragm dividing the housing into front and rear chambers and including a control valve mechanism comprising a pair of concentric sleeves of which the inner sleeve is generally of mushroom shape having on its forward end a head of substantial diameter, a valve spool working in a blind bore in the inner sleeve and having a valve stem engaging with a forwardly extending axial portion of the outer sleeve which is recessed to receive an actuating rod, and a flexible rubber insert connected to the inner sleeve and against which the valve spool seats resiliently to prevent air entering the rear chamber when the booster is de-energised and both chambers are connected to a source of vacuum, a centrally apertured resilient or flexible sheet metal disc in front of the diaphragm and engaging at its inner edge with a forwardly facing annular shoulder on the outer sleeve and at an intermediate point in its radial length with abutment means on the head of the inner sleeve, in which operation of the actuating rod moves the outer sleeve forwardly to apply a forwardly directed force to the inner edge of the disc and at the same time advancing the valve spool until the rubber insert engages with an annular seating in the inner sleeve thereby cutting off the vacuum supply to the rear chamber, further movement of the actuating rod moving the valve spool away from the rubber insert so that air is allowed to pass into the rear chamber energising the booster and subjecting the diaphragm to differential pressure which moves the diaphragm forwardly taking with it the outer sleeve and actuating a force transmitting member through the inner sleeve and causes the disc to dish or deform conically and apply a rearwardly directed force to the outer sleeve by the engagement of the inner edge of the disc with the annular shoulder of the outer sleeve, which force is transferred to the actuating rod to provide pedal "feel."

2. A fluid-pressure operated booster comprising a housing, a partition dividing the housing into front and rear compartments, each compartment being further divided into two separate chambers by a diaphragm of which the diaphragm dividing the rear compartment has in front of it a centrally apertured resilient or flexible sheet metal disc, a control valve mechanism comprising a pair of concentric sleeves of which the inner sleeve is generally of mushroom shape and has on its forward end a head of substantial diameter, a valve spool working in the inner sleeve and engaging at one end with a forwardly extending axial portion of the outer sleeve which is recessed to receive an actuating rod, and a valve member seating against the end of the inner sleeve remote from the actuating rod to prevent air from entering the rear chambers of each compartment when the booster is de-energised and the four chambers are connected to a source of vacuum, a piston in front of the diaphragm dividing the front compartment and having a piston rod secured to the end of the inner sleeve remote from the actuating rod, in which the disc in front of the diaphragm at the rear of the housing engages at its inner edge with the end of the outer sleeve remote from the actuating rod and at an intermediate point in its radial length with an annular abutment on the head of the inner sleeve, and operation of the actuating rod moves the outer sleeve forwardly to apply a force to the inner edge of the disc at the same time advancing the valve spool until it engages with the valve member to cut off the vacuum supply to the rear chambers of both compartments, further movement of the actuating rod moving the valve member away from its seating at the end of the inner sleeve so that air is allowed to pass into the rear chambers of both compartments energising the booster and subjecting the diaphragms to differential pressures which move the diaphragms forwardly taking with them the outer sleeve and the piston which actuate the piston of the master cylinder through the inner sleeve and the piston rod, movement of the rear diaphragm causing the disc to dish or deform conically and the dishing or deformation applies a rearwardly directed force to the outer sleeve, which force is transferred to the actuating rod to provide pedal "feel."

3. A fluid-pressure operated booster as claimed in claim 1, in which the disc has on its forward face a series of radially directed flutes adapted to abut at an intermediate point in their lengths against a rearwardly facing annular abutment ring on the head of the inner sleeve, the flutes forming a series of levers which are tilted about the abutments on the head to apply a rearwardly directed force to the outer sleeve when the diaphragm backing the disc is subjected to the differential pressure.

4. A fluid-pressure operated booster as claimed in claim 2, in which the disc has a series of separate fingers extending from its periphery to its central aperture and joined together by a narrow annular connecting portion, the fingers being adapted to abut at an intermediate point in their lengths against a rearwardly facing annular abutment ring on the head of the inner sleeve, the fingers forming a series of levers which are tilted about the abutments on the head to apply a rearwardly directed force to the outer sleeve when the diaphragm backing the disc is subjected to the differential pressure.

5. A fluid-pressure operated booster comprising a housing defining a power chamber, at least one pressure responsive movable wall in said power chamber having a forward face and a rear face and adapted to be subjected to differential fluid pressures when the booster is energized, control valve means to control operation of said movable wall, manual operating means for operating said control valve means, inner and outer concentric sleeves of which said inner sleeve passes through said movable wall, abutment means on the forward end of said inner sleeve and adapted to be engaged by the forward face of said movable wall, said abutment means providing a fulcrum for said movable wall when said booster is energized, said outer sleeve co-operating with said control valve and said manual operating means and at its forward end being adapted to abut against the rear face of said movable wall at a point spaced radially inwards from its point of engagement with said abutment means on said inner sleeve, whereby upon energization of said booster said movable wall fulcrums about said abutment on said inner sleeve and applies to said operating means a reaction dependent upon the differential pressure to which said movable wall is subjected.

6. A fluid-pressure operated booster comprising a housing defining a power chamber, at least one pressure responsive movable wall in said power chamber, said movable wall comprising a flexible piston having a forward face and a rear face and adapted to be subjected to differential fluid pressures when the booster is energized, control valve means to control operation of said movable wall, manual operating means for actuating said valve means, inner and outer concentric sleeves of which said inner sleeve passes through said flexible piston and on its forward end has a head of substantial diameter, abutment means on said head on said inner sleeve and adapted to be engaged by the forward face of said flexible piston, said abutment means providing a fulcrum for said flexible piston when said booster is energized, said outer sleeve co-operating with said control valve means and said manual operating means and at its forward end being adapted to abut against the rear face of said wall at a point spaced radially inwards from its point of engagement with said abutment means on said head on said inner sleeve, whereby upon energization of said booster said flexible piston fulcrums about said abutment on said head on said inner sleeve and dishes conically applying to said manual operating means a reaction dependent upon the differential pressure to which said flexible piston is subjected.

7. A fluid-pressure operated booster comprising a housing defining a power chamber, at least one pressure responsive movable wall in said power chamber having a forward face and a rear face and adapted to be subjected to differential fluid pressure when the booster is energized, control valve means to control operation of said movable wall, manual operating means for actuating said valve means, inner and outer concentric sleeves of which said inner sleeve passes through said movable wall and on its forward end has a head of substantial diameter, abutment means on said head on said inner sleeve and adapted to be engaged by the forward face of said movable wall, said abutment means providing a fulcrum for said movable wall when said booster is energized, said movable wall comprising a flexible disc, a diaphragm supporting said flexible disc and providing a seal between the inner periphery of the housing and one of said sleeves, said outer sleeve co-operating with said control valve and said manual operating means and at its forward end being adapted to abut against the rear face of said movable wall at a point spaced radially inwards from its point of engagement with said abutment means on said head on said inner sleeve, whereby upon energization of said boster said flexible disc fulcrums about said abutment on said head on said inner sleeve and dishes conically applying to said manual operating means a reaction dependent upon the differential pressure to which said movable wall is subjected.

8. A fluid-pressure operated booster comprising a housing defining a power chamber, at least one pressure responsive movable wall in said power chamber having a forward face and a rear face and adapted to be subjected to differential fluid pressures when the booster is energized, control valve means to control operation of said movable wall, manual operating means for actuating said valve means, inner and outer concentric sleeves of which said inner sleeve passes through said movable wall and on its forward end has a head of substantial diameter, an annular abutment ring on said head on said inner sleeve, said movable wall comprising a flexible disc, a series of radially directed flutes on the forward face of said flexible disc and adapted to engage said abutment ring, and a diaphragm supporting said flexible disc and providing a seal between the inner periphery of said housing and one of said sleeves, said abutment ring providing a fulcrum for said radially directed flutes on said flexible disc when said booster is energized, said outer sleeve co-operating with said control valve and said manual operating means and at its forward end being adatped to abut against the rear face of said movable wall at a point spaced radially inwards from the point of engagement of its flutes with said abutment ring on said head on said inner sleeve, whereby upon energization of said booster said flexible disc fulcrums about said abutment ring on said inner sleeve and dishes conically applying to said manual operating means a reaction dependent upon the differential pressure to which said movable wall is subjected.

9. A fluid-pressure operated booster comprising a housing defining a power chamber, at least one pressure responsive movable wall in said power chamber having a forward face and a rear face and adapted to be subjected to differential fluid pressures when the booster is energized, control valve means to control operation of said movable wall, manual operating means for actuating said control valve means, inner and outer concentric sleeves of which said inner sleeve passes through said movable wall and on its forward end has a head of substantial diameter, said movable wall comprising a flexible disc, a series of radially directed flutes on the forward face of said flexible disc and a diaphragm supporting said flexible disc and providing a seal between the inner periphery of said housing and one of said sleeves, circumferentially spaced abutments on said head on said inner sleeve and engaging with said flexible disc between said flutes, said abutments providing a fulcrum for flexible disc when said booster is energized, said outer sleeve co-operating with said control valve and said manual operating means and at its forward end being adapted to abut against the rear face of said movable wall at a point spaced radially inwards from its point of engagement with said abutments on said head on said inner sleeve, whereby upon energization of said booster said flexible disc fulcrums about said abutments on said inner sleeve and dishes conically applying to said manual operating means a reaction dependent upon the differential pressure to which said movable wall is subjected.

10. A fluid-pressure operated booster comprising a housing defining a power chamber, at least one pressure responsive movable wall in said power chamber having a forward face and a rear face and adapted to be subjected to differential fluid pressures when the booster is energized, control valve means to control operation of said movable wall, manual operating means for actuating said control valve means, inner and outer concentric sleeves of which said inner sleeve passes through said movable wall and on its forward end has a head of substantial diameter, said movable wall comprising a flexible disc, a series of separate fingers extending radially inwards from the periphery of said flexible disc and joined by a narrow annular connecting portion, and a diaphragm supporting said flexible disc and providing a seal between the inner periphery of said housing and one of said sleeves, an annular abutment on said head on said inner sleeve and engaging with said fingers on said flexible disc, said annular abutment providing a fulcrum for said flexible disc when said boosters energized, said outer sleeve co-operating with said control valve and said manual operating means and at its forward end being adapted to abut against the rear face of said movable wall at a point space radially inwards from its point of engagement with said annular abutment on said head of said inner sleeve, whereby upon energization of said booster said flexible disc fulcrums about said abutment on said inner sleeve and dishes conically applying to said manual operating means a reaction dependent upon the differential pressure to which said movable wall is subjected.

References Cited

UNITED STATES PATENTS

| | | | |
|---|---|---|---|
| 2,667,861 | 2/1954 | Rockwell | 91—376 |
| 2,972,983 | 2/1961 | Ayers | 91—369 |
| 2,989,033 | 6/1961 | Stelzer | 91—369 |
| 2,990,917 | 7/1961 | Stelzer | 91—369 |
| 3,026,853 | 3/1962 | Stelzer | 91—369 |
| 3,033,173 | 5/1962 | Bauman | 91—376 |
| 3,183,789 | 5/1965 | Stelzer | 91—369 |

MARTIN P. SCHWADRON, *Primary Examiner.*

FRED E. ENGELTHALER, SAMUEL LEVINE, EDGAR W. GEOGHEGAN, *Examiners.*

P. E. MASLOUSKY, *Assistant Examiner.*